US011400860B2

(12) United States Patent
Mualla et al.

(10) Patent No.: US 11,400,860 B2
(45) Date of Patent: Aug. 2, 2022

(54) CMS SYSTEMS AND PROCESSING METHODS FOR VEHICLES

(71) Applicant: SMR Patents S.à.r.l., Luxembourg (LU)

(72) Inventors: Firas Mualla, Stuttgart (DE); Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/507,807

(22) Filed: Jul. 10, 2019

(65) Prior Publication Data

US 2019/0329709 A1 Oct. 31, 2019

Related U.S. Application Data

(63) Continuation-in-part of application No. 15/287,554, filed on Oct. 6, 2016, now Pat. No. 10,395,125.

(51) Int. Cl.
| | |
|---|---|
| *B60R 1/00* | (2022.01) |
| *G06T 7/00* | (2017.01) |
| *G06T 5/00* | (2006.01) |
| *G06F 3/14* | (2006.01) |
| *H04N 5/445* | (2011.01) |

(Continued)

(52) U.S. Cl.
CPC .............. *B60R 1/00* (2013.01); *G06F 3/1423* (2013.01); *G06T 5/001* (2013.01); *G06T 7/0002* (2013.01); *G06V 20/58* (2022.01); *H04N 5/445* (2013.01); *B60R 2300/20* (2013.01);

(Continued)

(58) Field of Classification Search
CPC ............ G06K 9/00805; G06K 9/00369; B60R 2300/30; B60R 2300/70; B60R 2300/8093; G08G 1/16; B60W 50/14; G06T 2207/30261
See application file for complete search history.

(56) References Cited

U.S. PATENT DOCUMENTS

| | | | |
|---|---|---|---|
| 6,285,393 | B1 | 9/2001 | Shimoura et al. |
| 7,038,577 | B2 | 5/2006 | Pawlicki et al. |
| | | (Continued) | |

FOREIGN PATENT DOCUMENTS

| | | |
|---|---|---|
| CN | 104185009 A | 12/2014 |
| CN | 104210424 A | 12/2014 |
| | (Continued) | |

OTHER PUBLICATIONS

Burl et al., 1998, "A probabilistic approach to object recognition using local photometry and global geometry", ComputerVisionECCV98, 628-41.

(Continued)

*Primary Examiner* — Robert J Hance
(74) *Attorney, Agent, or Firm* — Jones Day (57) ABSTRACT

A image detection and classification system for a vehicle includes a first display, a second display, an image capturing unit for capturing an image and displaying the image on at least one of the first display and the second display, and an image processing unit configured to process the captured image to improve a clarity of the captured image in response to the captured image having an obstruction value exceeding a threshold obstruction value. A method for operation of the image detection and classification system is also described.

13 Claims, 7 Drawing Sheets

(51) Int. Cl.
*G06V 20/58* (2022.01)
*G08G 9/02* (2006.01)

(52) U.S. Cl.
CPC . *B60R 2300/30* (2013.01); *G06T 2207/30168* (2013.01); *G06T 2207/30252* (2013.01); *G08G 9/02* (2013.01)

(56) References Cited

U.S. PATENT DOCUMENTS

| | | | |
|---|---|---|---|
| 8,140,226 B2 | 3/2012 | Waqner et al. | |
| 8,446,468 B1 | 5/2013 | Medioni et al. | |
| 9,230,165 B2 | 1/2016 | Guan | |
| 9,258,564 B2 | 2/2016 | Pau | |
| 9,770,987 B1* | 9/2017 | Glaser | G01C 21/3697 |
| 2005/0223031 A1 | 10/2005 | Zisserman et al. | |
| 2009/0016636 A1* | 1/2009 | Kasashima | G06V 10/273 |
| | | | 348/E5.058 |
| 2009/0157268 A1 | 6/2009 | Chiba et al. | |
| 2010/0079481 A1 | 4/2010 | Zhanq et al. | |
| 2010/0201820 A1 | 8/2010 | Lopata et al. | |
| 2012/0162427 A1* | 6/2012 | Lynam | B60R 11/04 |
| | | | 348/148 |
| 2013/0300869 A1* | 11/2013 | Lu | H04N 7/18 |
| | | | 348/148 |
| 2014/0111647 A1 | 4/2014 | Alsman et al. | |
| 2014/0293079 A1* | 10/2014 | Milanfar | H04N 5/2171 |
| | | | 348/222.1 |
| 2016/0042253 A1 | 2/2016 | Sawhnev et al. | |
| 2016/0057393 A1* | 2/2016 | Won | G06K 9/4642 |
| | | | 348/148 |
| 2016/0200254 A1* | 7/2016 | Raab | B60R 1/00 |
| | | | 348/148 |
| 2017/0109590 A1* | 4/2017 | Gehrke | H04N 17/002 |
| 2017/0313288 A1* | 11/2017 | Tippy | B60R 1/0602 |
| 2018/0033120 A1* | 2/2018 | Wang | G07C 5/00 |
| 2018/0141521 A1* | 5/2018 | Irie | H04N 17/002 |
| 2019/0179140 A1* | 6/2019 | Oba | H04N 7/183 |
| 2020/0086791 A1* | 3/2020 | Hardy | G06T 5/005 |

FOREIGN PATENT DOCUMENTS

| | | | | |
|---|---|---|---|---|
| EP | 2233360 A1 * | 9/2010 | | B60R 1/06 |
| EP | 2293588 A1 * | 3/2011 | | B60R 1/00 |
| EP | 2619728 A1 | 7/2013 | | |
| EP | 3008694 A1 | 7/2016 | | |
| JP | 2006172333 A * | 6/2006 | | |
| JP | 2012156594 A * | 8/2012 | | |
| KR | 20090011826 A * | 2/2009 | | |
| KR | 20170015154 A * | 2/2017 | | |
| SE | 519864 C2 * | 4/2003 | | B60R 1/00 |
| WO | WO-9500364 A1 * | 1/1995 | | B29C 45/14549 |
| WO | WO-2018149593 A1 * | 8/2018 | | B60R 1/00 |

OTHER PUBLICATIONS

Fergus, 2005, Visual Object Category Recognition, Ph. D thesis, U. of Oxford.
Fischler and Elschlager, 1973, "The representation and matching of pictoral structures", IEEE Transactions on Computers, C-22(1):67-92.
Leibe et al., 2004, "Combined object categorization and segmentation with an implicit shape model", ECCV Workshop on Statistical Learning in Computer Vision, pp. 17-32.
Weber, 2000, Unsupervised Learning of Models for Object Recognition, Ph. D. thesis, CalTech.
Zhang and Lu, 2004, "Review of shape representations and description techniques", Pattern Recognition, 37(1):1-19.

* cited by examiner

CMS SYSTEMS AND PROCESSING METHODS FOR VEHICLES

CROSS-REFERENCE TO RELATED APPLICATIONS

This application is a continuation-in-part of U.S. patent application Ser. No. 15/287,554, filed Apr. 12, 2018, which is hereby incorporated by reference in its entirety for all purposes.

BACKGROUND

1. Field of the Invention

The present disclosure is related to image processing methods and devices for displaying captured images as part of an image detection and classification system or rear view system of a vehicle. For example, image feature descriptors may be used for identifying and classifying objects in captured images in a hazard detection and information system, and processed images may be used in response to lack of image clarity conditions.

2. Related Art

Typically, motor vehicles or any other vehicles may implement a camera monitoring system (CMS) to replace or cooperate with conventional mirrors. Technology related to object detection and classification in captured images, and technology related to the clarity of captured images have been explored.

With respect to dirt or debris in CMS systems, if dust, dirt or rain is on a camera for a CMS system, the picture may not be displayed properly. Some vehicle regulations according to certain jurisdictions may not allow manipulation of the image on the display. Presently, warnings can only be provided to the driver that the system is not working correctly because of the dirt on the camera. The driver then usually needs to move out rapidly to clean the system if the system doesn't have an automated cleaning device.

With respect to object detection, an object detection and classification system analyzes images captured by an image sensor for a hazard detection and information system, such as on a vehicle. Extracting circuitry is configured to extract at least one feature value from one or more keypoints in an image captured by an image sensor of the environment surrounding a vehicle. A new image feature descriptor is derived from a periodic descriptor function, which depends on the distance between at least one of the keypoints and a chosen query point in complex space and depends on a feature value of at least one of the keypoints in the image.

Query point evaluation circuitry is configured to sample the periodic descriptor function for a chosen query point in the image from the environment surrounding the vehicle to produce a sample value. The sample value for a query point may be evaluated to determine whether the query point is the center of an object or evaluated to determine what type of object the query point is a part of.

If the evaluated query point satisfies a potential hazard condition, such as if the object is classified as a vulnerable road user or object posing a collision threat, a signal bus is configured to transmit a signal to alert the operator of the vehicle to the object. Additionally, or alternatively, the signal bus may transmit a signal to a control apparatus of the vehicle to alter the vehicle's speed and/or direction to avoid collision with the object.

The object detection and classification system disclosed herein may be used in the area of transportation for identifying and classifying objects encountered in the environment surrounding a vehicle, such as on the road, rail, water, air, etc., and alerting the operator of the vehicle or autonomously taking control of the vehicle if the system determines the encountered object poses a hazard, such as a risk of collision or danger to the vehicle or to other vehicles or persons in the area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, an image detection and classification system for a vehicle includes a first display, a second display, an image capturing unit for capturing an image and displaying the image on at least one of the first display and the second display, and an image processing unit configured to process the captured image to improve a clarity of the captured image in response to the captured image having an obstruction value exceeding a threshold obstruction value.

In another aspect, a method for providing an improved clarity image for an image detection and classification system includes providing an image detection and classification system, including a first display; a second display; an image capturing unit; and an image processing unit; capturing an image of environment surrounding the vehicle using the image capturing unit; determining an obstruction value of the captured image depending on obstruction of the captured image; determining whether the obstruction value of the captured image exceeds a threshold obstruction value; displaying the captured image on the first display; and processing the captured image and displaying the processed captured image on the second display in response to the obstruction value exceeding the threshold obstruction value.

In another aspect, a vehicle includes the image detection and classification system.

Other implementations are also described and recited herein.

DETAILED DESCRIPTION

The implementations disclosed herein relate to an object detection and classification system for use in a variety of contexts. The present disclosure contains a novel feature descriptor that combines information relating to what a feature is with information relating to where the feature is located with respect to a query point. This feature descriptor provides advantages over prior feature descriptors because, by combining the "what" with the "where," it reduces the resources needed to detect and classify an object because a single descriptor can be used instead of multiple feature descriptors. The resulting system therefore is more efficient than prior systems, and can more accurately detect and classify objects in situations where hardware and/or software resources are limited.

Figure 1:
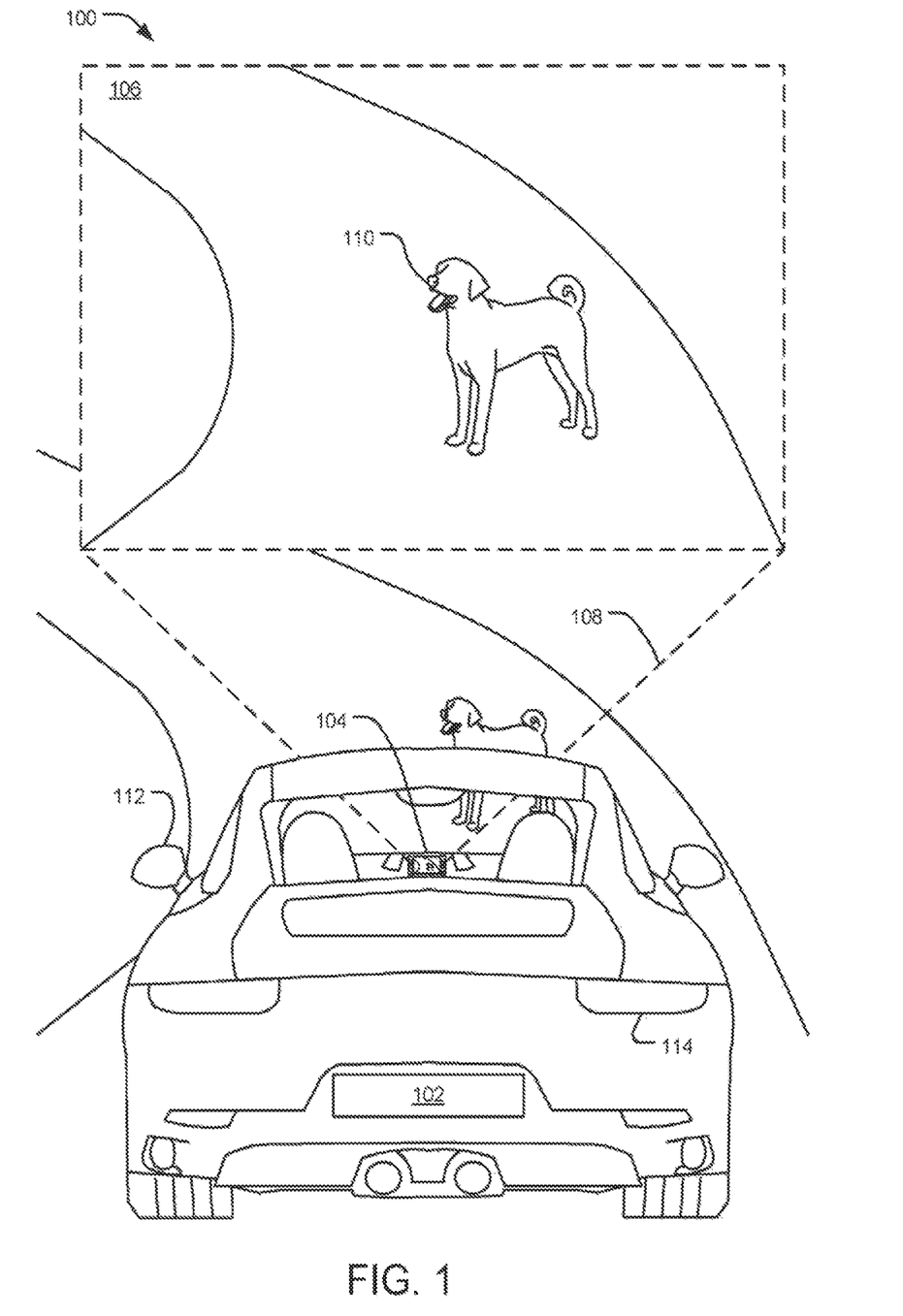
FIG. 1 illustrates an example of a rear view of a vehicle with an object detection and classification system.

FIG. 1 illustrates a rear view of a vehicle 102 with an object detection and classification system 100 according to the present disclosure. The vehicle 102 includes an image sensor 104 to capture an image 106 of the environment surrounding the vehicle 102. The image may include a range of view through an angle 108, thus the image 106 may depict only a portion of the area surrounding the vehicle 102 as defined by the angle 108. The image 106 may include an object 110. The object 110 may be any physical object in the environment surrounding the vehicle 102, such as a pedestrian, another vehicle, a bicycle, a building, road signage, road debris, etc. The object detection and classification system 100 may assign a classification to the object 110. The classification may include the type of road object, whether the object is animate or inanimate, whether the object is likely to suddenly change direction, etc. The object detection and classification system 100 may further assign a range of characteristics to the object 110 such as a size, distance, a point representing the center of the object, a velocity of the object, an expected acceleration range, etc.

The image sensor 104 may be various types of optical image sensors, including without limitation a digital camera, a range finding camera, a charge-coupled device (CCD), a complementary metal oxide semiconductor (CMOS) sensor, or any other type of image sensor capable of capturing continuous real-time images. In an implementation, the vehicle 102 has multiple image sensors 104, each image sensor 104 may be positioned so as to provide a view of only a portion of the environment surrounding the vehicle 102. As a group, the multiple image sensors 104 may cover various views from the vehicle 102, including a front view of objects in the path of the vehicle 102, a rear-facing image sensor 104 for capturing images 106 of the environment surrounding the vehicle 102 including objects behind the vehicle 102, and/or side-facing image sensors 104 for capturing images 106 of object next to or approaching the vehicle 102 from the side. In an implementation, image sensors 102 may be located on various parts of the vehicle. For example, without limitation, image sensors 102 may be integrated into an exterior mirror of the vehicle 102, such as on the driver's exterior side mirror 112. Alternatively, or additionally, the image sensor 102 may be located on the back of the vehicle 102, such as in a rear-light unit 114. The image sensor 102 may be forward-facing and located in the interior rear-view mirror, dashboard, or in the front headlight unit of the vehicle 102.

Upon capture of an image 106 of the environment surrounding the vehicle 102, the object detection and classification system 100 may store the image 106 in a memory and perform analysis on the image 106. One type of analysis performed by the object detection and classification system 100 on the image 106 is the identification of keypoints and associated keypoint data. Keypoints, also known as interest points, are spatial locations or points in the image 106 that define locations that are likely of interest. Keypoint detections methods may be supplied by a third party library, such as the SURF and FAST methods available in the OpenCV (Open Source Computer Vision) library. Other methods of keypoint detection include without limitation SIFT (Scale-Invariant Feature Transform). Keypoint data may include a vector to the center of the keypoint describing the size and orientation of the keypoint, and visual appearance, shape, and/or texture in a neighborhood of the keypoint, and/or other data relating to the keypoint.

A function may be applied to a keypoint to generate a keypoint value. A function may take a keypoint as a parameter and calculate some characteristic of the keypoint. As one example, a function may measure the image intensity of a particular keypoint. Such a function may be represented as $f(z_k)$, where $f$ is the image intensity function and $z_k$ is the $k^{th}$ keypoint in an image. Other functions may also be applied, such a visual word in a visual word index.

Figure 2:
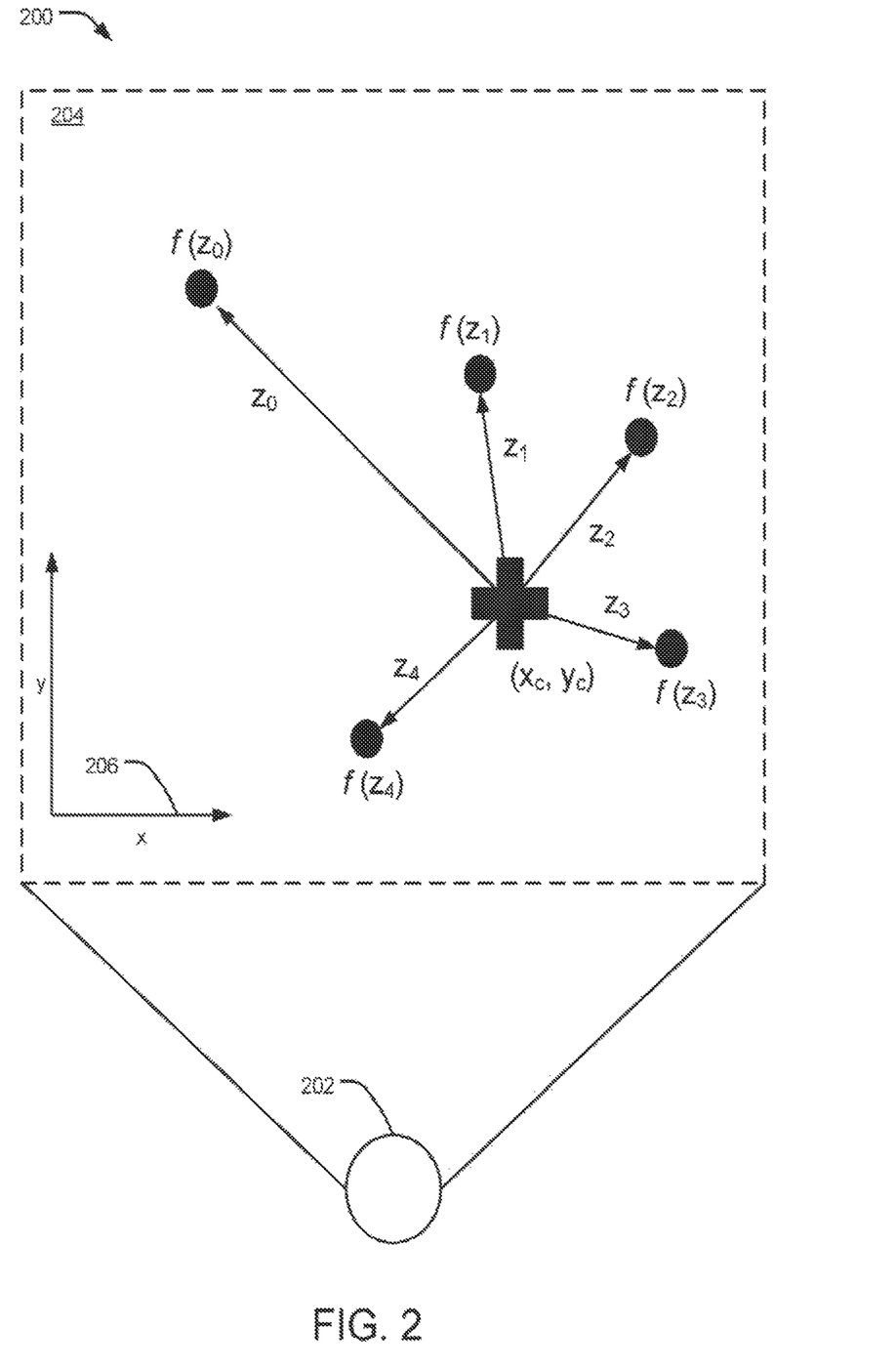
FIG. 2 is a schematic of an example of an image capture with a query point and a plurality of keypoints.

FIG. 2 illustrates a schematic diagram 200 of an image capture 204 taken by an image sensor 202 on a vehicle. The image capture 204 includes a query point $(x_c, y_c)$ and a plurality of keypoints $z_0$-$z_4$. A query point is a point of interest that may or may not be a keypoint, for which the object detection and classification system may choose for further analysis. In an implementation, the object detection and classification system may attempt to determine whether a query point is the center of an object to assist in classification of the object.

Points in the image capture 204 may be described with reference to a Cartesian coordinate system wherein each point is represented by an ordered pair, the first digit of the pair referring to the point's position along the horizontal or x-axis, and the second digit of the pair referring to the point's position along the vertical or y-axis. The orientation of the horizontal and vertical axes with respect to the image 204 is shown by the axis 206. Alternatively, points in the image capture 204 may be referred to with complex numbers where each point is described in the form x+iy where $i=\sqrt{(-1)}$. In another implementation, a query point may serve as the origin of a coordinate system, and the locations of keypoints relative to the query point may be described as vectors from the query point to each of the keypoints.

The image detection and classification system 100 uses a new descriptor function, to produce an evaluation of a query point in an image 204 that combines a representation of what the feature is and where the feature is located in relation to the query point into a single representation. For any image 204 with a set of keypoints $z_0$-$z_4$ in the neighborhood of a query point $(x_c, y_c)$, the descriptor for the query point is as follows:

$$F(\zeta) = \frac{1}{N}\sum_{k=0}^{N-1}(z_k - z_c)e^{j2\pi f(z_k)\zeta} \quad (1)$$

where N is the number of keypoints in the image from the environment surrounding the vehicle in the neighborhood of the query point, $z_c$ is the query point represented in complex space, $z_k$ is the $k^{th}$ keypoint, $f(z_k)$ is the feature value of the $k^{th}$ keypoint, and is the continuous independent variable of the descriptor function $F(\zeta)$ To obtain a descriptor that is invariant to scale and orientation, Equation (1) may be modified by letting $z_m$ be the mean value of $z_k$ values:

$$z_m = \frac{1}{N}\sum_{k=0}^{N-1}(z_k - z_c) \quad (2)$$

By dividing the right-hand side of Equation (1) by $|z_m|$, a scale invariant version of the descriptor is obtained. On the other hand, by dividing both sides of Equation (1) by $$\frac{z_m}{|z_m|}$$

a rotation-invariant version of the descriptor is obtained. In order to write a descriptor that is invariant in both scale and orientation, dividing by $z_m$ yields the following descriptor:

$$F(\zeta) = \frac{1}{z_m}\sum_{k=0}^{N-1}(z_k - z_c)e^{i2\pi f(z_k)\zeta} \quad (3)$$

The division by N is omitted from Equation (3) since the contribution of the keypoint number is already neutralized through the division by $z_m$. Due to the similarity of Equation (3) to the formula for the Inverse Fourier Series, Equation (3) may be referred to herein as a Fourier Fan.

Since Equation (3) is a function of a continuous variable $\zeta$, it may be sampled for use in the object detection and classification system 100. In an implementation, a sampling frequency greater than 2 max(f) may be chosen where max( ) indicates the maximum value of the function $f$. Another characteristic of Equation (3) is that it is infinite over the domain of the variable Sampling an infinite equation will result in an infinite number of samples, which may not be practical for use in the object detection and classification system 100. If Equation (3) is a periodic function, however, then it would be sufficient to sample one only a single period of Equation (3), and to ignore the remaining periods. In an implementation, Equation (3) is made to be periodic by requiring all values of the function $f$ to be integer multiples of a single frequency f0. As such, for Equation (3) to be able to be sampled, the function $f$ must have a known maximum, and for the Equation (3) to be periodic, the function $f$ must be quantized such that the values of $f$ are integer multiples of f0.

In an implementation, the function $f$ may represent more than a simple feature, such as the image intensity. Instead, the function $f$ may be a descriptor function of each of the keypoints, such as those referred to herein (e.g., SIFT and/or SURF descriptors). Such descriptors are usually not simple scalar values, but rather are more likely to be high dimensional feature vectors, which cannot be incorporated directly in Equation (3) in a trivial manner. It is, however, possible to incorporate complex descriptors as feature values by clustering the descriptors in an entire set of training data and to use the index of the corresponding cluster as the value for $f$. Such cluster centers may be referred to as "visual words" for $f$. Let $fk$ be the descriptor for a keypoint k, $fk$ takes integer values, e.g., 3, then there is a descriptor at the keypoint located at $z_k - z_c$, which can be assigned to cluster 3. It should be appreciated that, in this example, $f$ is quantized and the number of clusters is the function's maximum which is known. These characteristics are relevant because they are the characteristics of $f$ needed to make Equation (3) able to be sampled and periodic.

In an implementation, an order is imposed on the visual word cluster centers, such that the output of $f$ is not a categorical value. In other words, without an order, the distance between cluster 2 and cluster 3 is not necessarily less than the distance between cluster 2 and cluster 10 because the numerical values are merely identifiers for the clusters. An order for the visual words may be imposed using multidimensional scaling (MDS) techniques. Using MDS, one can find a projection into a low dimensional feature space from a high dimensional feature space such that distances in the low dimensional feature space resemble as much as possible distances in the high dimensional feature space. Applied to the visual words using MDS, the cluster centers may be projected into a one dimensional space for use as a parameter for $f$. In one implementation, a one dimensional feature space is chosen as the low dimensional feature space because one dimensional space is the only space in which full ordering is possible.

Training an object detection and classification system based on Foruier Fans might be susceptible to a problem known in the machine learning community as "overfitting". Overfitting manifests itself when machine classifiers over-learn the training data leading to models which do not generalize well on other data, the other data being referred to herein as "test data." In the descriptor of Equation (3), overfitting could occur if, on training data, the object detection and classification system overfits the positions of the keypoints with respect to the query point. Changes in the positions of the keypoints that are not present in training data, which could occur due to noise and intra-class variance, will not always be handled well by the object detection and classification system when acting on test data. To address the issue of overfitting, at each query point ($x_c$, $y_c$), instead of extracting a single Fourier Fan Equation (3) on training data, multiple random Fans may be extracted, denoted by the set M$f$ (e.g., 15$f$). Each of the random Fans contains only a subset of the available N keypoints in the neighborhood of the query point ($x_c$, $y_c$). Later, when the object detection and classification system is running on test data, the same set M$f$ of random Fourier Fans is extracted, and the result is confirmed according to majority agreement among the set of random Fourier Fans. Random Fourier Fans also allow the object detection and classification system to learn from a small number of images since several feature vectors are extracted at each object center.

In the comparison of Equation (3), the "Fourier Fan," to the formula for the inverse Fourier Series, it should be understood that there are some differences between the two. For example, only those frequencies that belong to the neighborhood of a query point are available for each Fourier Fan. As another example, shifting all coefficients $z_k$ by a constant $z_a$, i.e. a shift of the object center, is not equivalent to adding a Dirac impulse in the $\zeta$ domain, even if it is assumed that the same keypoints are available in the new query point neighborhood. This is true because the addition of $z_a$ is not a constant everywhere, but only to the available frequencies, and zero for the other frequencies.

Figure 3:
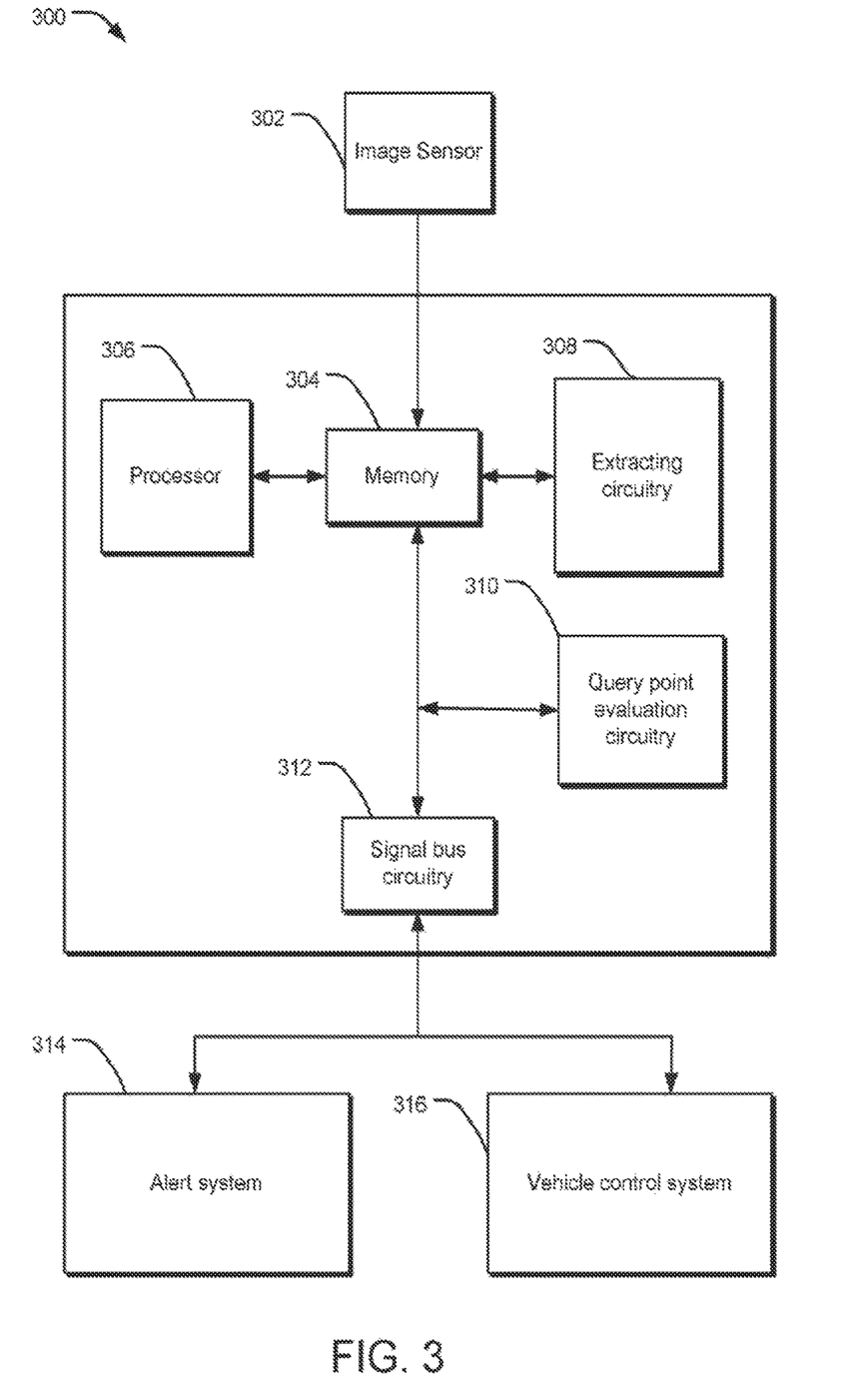
FIG. 3 is a block diagram of an example of a system for implementing the described operations.

FIG. 3 illustrates a block diagram of an object detection and classification system 300 that may be useful for the implementations disclosed herein. The object detection and classification system 300 includes an image sensor 302 directed at the environment surrounding a vehicle. The image sensor 302 may capture images of the environment surrounding the vehicle for further analysis by the object detection and classification system 300. Upon capture, an image from the environment surrounding a vehicle may be stored in the memory 304. The memory 304 may include volatile or non-volatile memory and may store images captured by the image sensor as well as data produced by analysis of the images captured by the image sensor. A processor 306 may carry out operations on the images stored in memory 304. The memory 304 may also store executable program code in the form of program modules that may be executed by the processor 306. Program modules stored on the memory 304 include without limitation, hazard detection program modules, image analysis program modules, lens obstruction program modules, blind spot detection program modules, shadow detection program modules, traffic sign detection program modules, park assistance program modules, collision control and warning program modules, etc.

The memory 304 may further store parameters and settings for the operation of the object detection and classification system 300. For example, parameters relating to the training data may be stored on the memory 304 including a library of functions $f$ and keypoint settings for computation and calculation of Random Fourier Fans. The memory 304 may further be communicatively coupled to extracting circuitry 308 for extracting keypoints from the images stored on the memory 304. The memory 304 may further be communicatively coupled to query point evaluation circuitry 310 for taking image captures with keypoints and associated keypoint data and evaluating the images with keypoints and keypoint data according to Fourier Fans to produce sampled Fourier Fan values.

If the sampled Fourier Fan values produced by the query point evaluation circuitry 310 meet a potential hazard condition, then signal bus circuitry 312 may send a signal to an alert system 314 and/or a vehicle control system 316. Sampled Fourier Fan values may first be processed by one or more program modules residing on memory 304 to determine whether the sampled values meet a potential hazard condition. Examples of sampled values that may meet a potential hazard condition are an object determined to be a collision risk to the vehicle, an object that is determined to be a vulnerable road user that is at risk of being struck by the vehicle, a road sign object that indicates the vehicle is traveling in the wrong part of a road or on the wrong road, objects that indicate a stationary object that the vehicle might strike, objects that represent a vehicle located in a blind spot of the operator of the vehicle.

If the sampled values of a Fourier Fan function satisfy a potential hazard condition, the signal bus circuitry 312 may send one or more signals to the alert system 314. In an implementation, signals sent to the alert system 312 include acoustic warnings to the operator of the vehicle. Examples of acoustic warnings include bells or beep sounds, computerized or recorded human language voice instructions to the operator of the vehicle to suggest a remedial course of action to avoid the cause the of sample value meeting the potential hazard condition. In another implementation, signals sent to the alert system 314 include tactile or haptic feedback to the operator of the vehicle. Examples of tactile or haptic feedback to the operator of the vehicle include without limitation shaking or vibrating the steering wheel or control structure of the vehicle, tactile feedback to the pedals, such as a pedal that, if pushed, may avoid the condition that causes the sample value of the Fourier Fan to meet the potential hazard condition, vibrations or haptic feedback to the seat of the driver, etc. In another implementation, signals sent to the alert system 314 include visual alerts displayed to the operator of the vehicle. Examples of visual alerts displayed to the operator of the vehicle include lights or indications appearing on the dashboard, heads-up display, and/or mirrors visible to the operator of the vehicle. In one implementation, the visual alerts to the operator of the vehicle include indications of remedial action that, if taken by the operator of the vehicle, may avoid the cause of the sample value of the Fourier Fan meeting the potential hazard condition. Examples of remedial action, include an indication of another vehicle in the vehicle's blind spot, an indication that another vehicle is about to overtake the vehicle, an indication that the vehicle will strike an object in reverse that may not be visible to the operator of the vehicle, etc.

In another implementation, if the sampled values of a Fourier Fan function satisfy a potential hazard condition, the signal bus circuitry 312 may send one or more signals to the vehicle control system 316. Examples of signals sent to the vehicle control system 316 include signals to the steering system to alter the direction of the vehicle in an attempt to avoid the object that is the cause of the sampled values of the Fourier Fan function to satisfy the potential hazard condition. In another implementation, a signal sent to the vehicle control system 316 may include signals to sound the horn of the vehicle to alert the object that caused the sample values of the Fourier Fan function to satisfy the hazard condition that the vehicle with the object detection and classification system is present. In yet another implementation, the signal sent to the vehicle control system 316 include a signal to engage the brakes of the vehicle to avoid a collision with the detected object.

Figure 4:
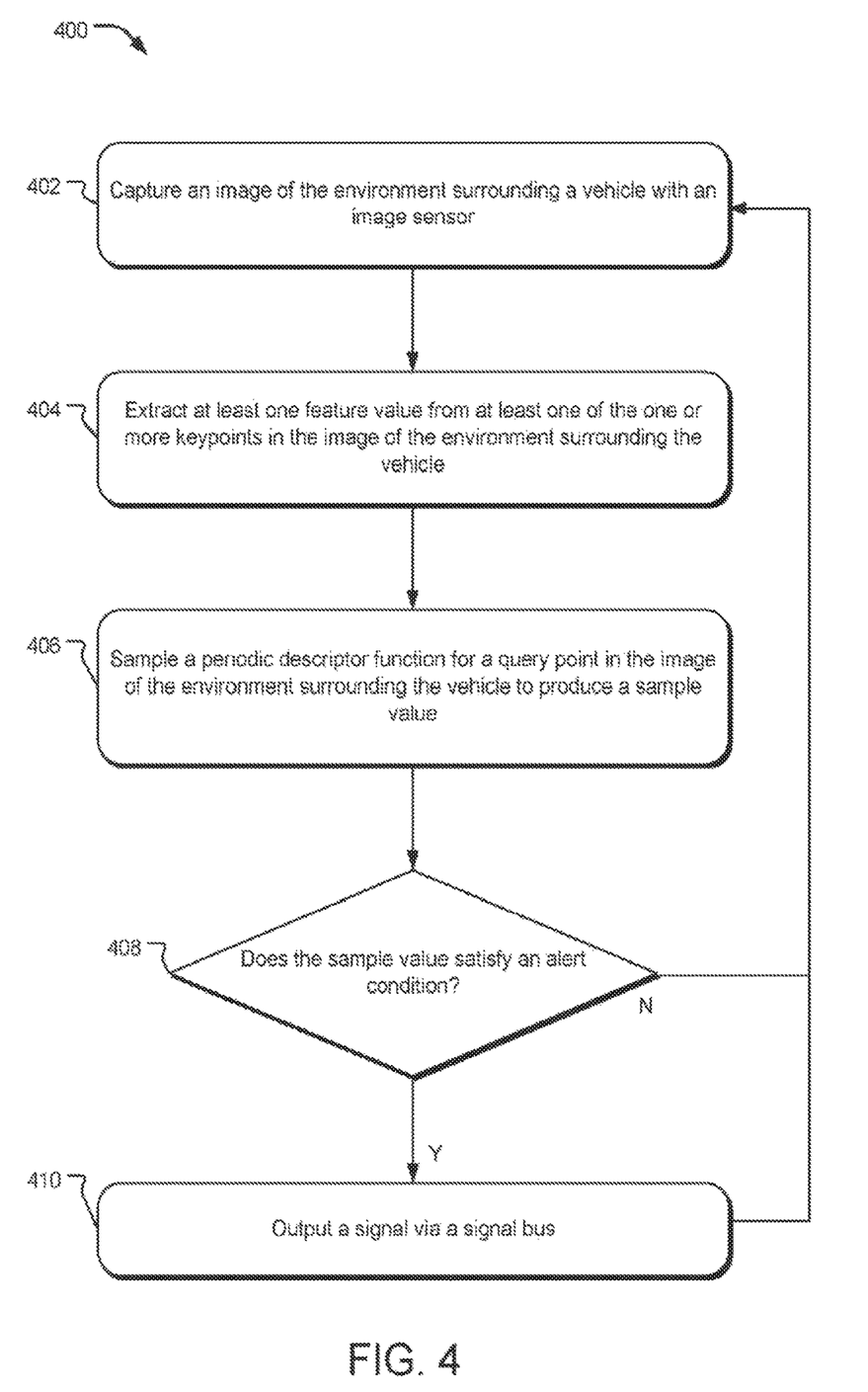
FIG. 4 illustrates example operations for detecting and classifying an object and transmitting a signal to an alert system and/or to a vehicle control system.

FIG. 4 illustrates example operations 400 for detecting and classifying an object and outputting a signal if a sample value of a Fourier Fan meets a potential hazard condition. A capturing operation 402 captures an image from the environment surrounding a system with an image sensor, the image from the environment surrounding the system having one or more keypoints. The image from the environment surrounding the system may be captured by an image sensor mounted anywhere on the system. In one implementation, the system is a vehicle. The captured image may be stored in a memory in an object detection and classification system. Once stored, a processor may execute a keypoint detection program module to identify the keypoints. Alternatively, or additionally, extracting circuitry may identify the keypoints in the image. The keypoints may be identified according to a number of methods, such as methods provided by third party libraries, and data parameters for the methods, such as the number of keypoints to extract or conditions for a keypoint extraction may be stored on the memory in the object detection and classification system.

Extracting operation 404 extracts at least one feature value from at least one of the one or more keypoints in the image from the environment surrounding the system. A processor may execute a feature value extraction program module to extract the features values of keypoints. Alternatively, or additionally, extracting circuitry may extract the feature values of keypoints in the stored image. The feature value of a keypoint may be determined according to a function $f$. In some embodiments, the function $f$ may have certain characteristics for use in a Fourier Fan Equation: having a known maximum, such that a sampling rate may be set to 2 max(f), and being periodic, such that only one period of $f$ need be sampled.

Sampling operation 406 samples a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the vehicle. In an implementation, the sampled periodic descriptor function in sampling operation 406 is Equation (3).

At decision block 408, if the sample value of the periodic descriptor function does not meet a potential hazard condition, then the method ends or returns to capturing operation 402. If the sample value of the periodic descriptor function does meet a potential hazard condition, then outputting operation 410 sends a signal via a signal bus. The signal sent via the signal bus in outputting operation 410 may be to an alert system of a vehicle, which may display an acoustic or visual signal to the operator of the vehicle regarding the object that is the cause of the sample value exceeding the potential hazard condition. In another embodiment, the signal bus sends at outputting operation 410 a signal to a vehicle control system. The system sent to the vehicle control system may cause the vehicle to change speed or direction without intervention from the operator of the vehicle to avoid a collision with the object that caused the sample value to exceed the potential hazard condition.

Figure 5:
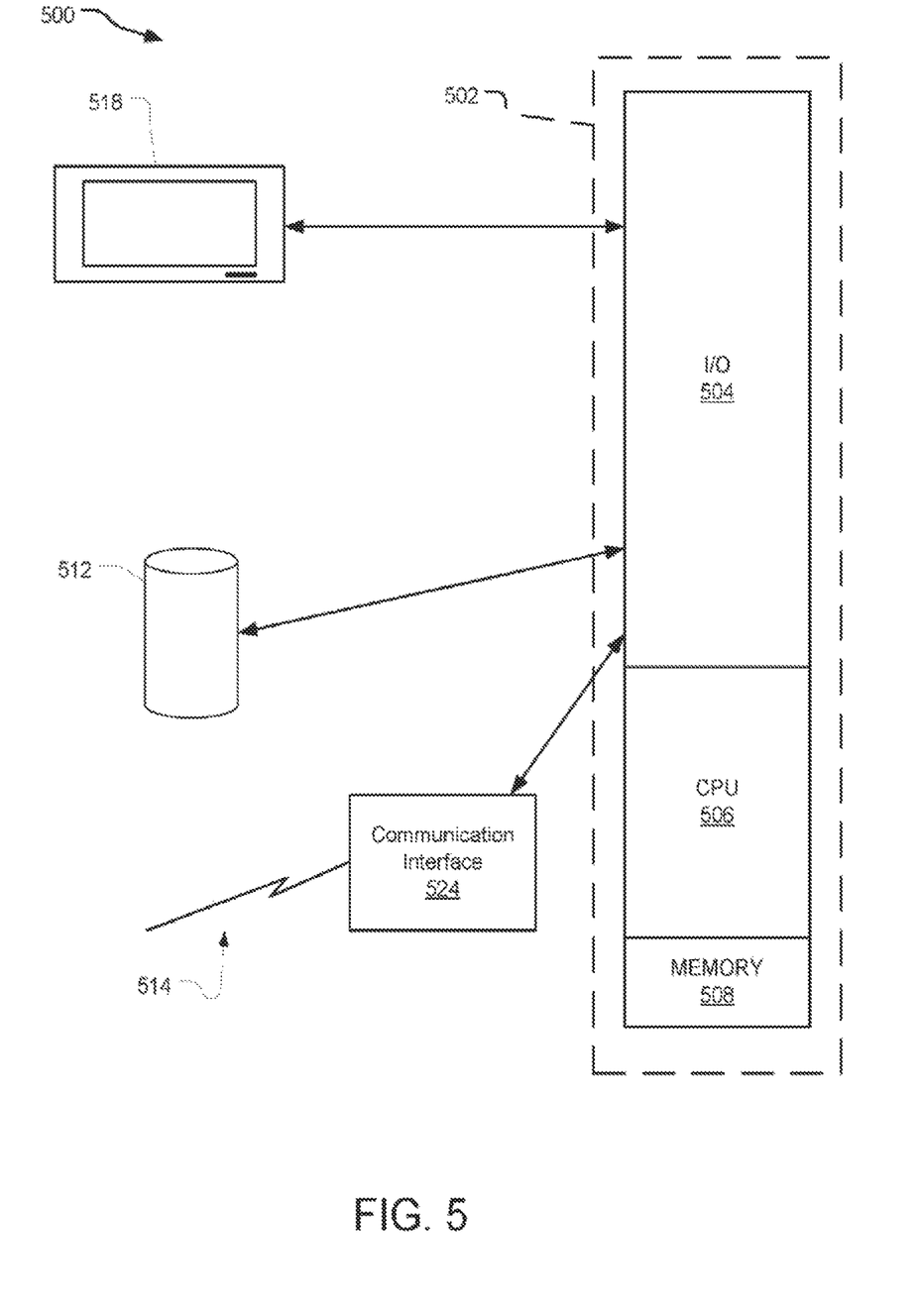
FIG. 5 is a block diagram of an example processor system suitable for implementing an object detection and classification system with Fourier fans.

FIG. 5 discloses a block diagram of a processor system 500 suitable for implementing one or more aspects of an object detection and classification system with fourier fans. The processor system 500 is capable of executing a processor program product embodied in a tangible processor-readable storage medium. Data and program files may be input to the processor system 500, which reads the files and executes the programs therein using one or more processors. Some of the elements of a processor system 500 are shown in FIG. 5 wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The processors may be single core or multi-core processors. The described technology is optionally implemented in software loaded in memory 508, a disc storage unit 512, and/or communicated via a wired or wireless network link 514 on a carrier signal (e.g., Ethernet, 3G wireless, 5G wireless, LTE (Long Term Evolution)) thereby transforming the processing system 500 in FIG. 5 to a special purpose machine for implementing the described operations. The disc storage unit 512 may include volatile memory, non-volatile memory, solid state memory, flash memory, hybrid, and/or traditional magnetic rotating data storage media.

The I/O section 504 may be connected to one or more user-interface devices (e.g., a mobile device, a touch-screen display unit 518, etc.) or the disc storage unit 512. Processor program products containing mechanisms to effectuate the systems and methods in accordance with the described technology may reside in the memory section 508 or on the storage unit 512 of such a system 500.

A communication interface 524 is capable of connecting the processor system 500 to an enterprise network via the network link 514, through which the processor system 500 can receive and/or send instructions and data embodied in a carrier wave. The communication interface 524 may receive signals and data representing an image from the environment surrounding the system via an image sensor. The communication interface may send signals from the processor system 500 to the image detection and classification system including without limitation audible alert signals sent to the operator of a vehicle, data signals sent to a HUD (heads-up-display) visible to the operator of a vehicle, a video screen such as display 518 that is visible to the operator of a vehicle for display of information regarding objects and/or alerts, a vehicle control signal for altering the control of a vehicle to avoid a hazard, etc.

When used in a local area networking (LAN) environment, the processor system 500 is connected (by wired connection or wirelessly) to a local network through the communication interface 524, which is one type of communications device. When used in a wide-area-networking (WAN) environment, the processor system 500 typically includes a modem, a network adapter, or any other type of communications device for establishing communications over the wide area network. In a networked environment, program modules depicted relative to the processor system 500 or portions thereof, may be stored in a remote memory storage device. It is appreciated that the network connections shown are examples of communications devices for, and other means of, establishing a communications link between the processor and other devices may be used.

In an example implementation, a network agent of an enterprise network may be embodied by instructions stored in memory 508 and/or the storage unit 512 and executed by the processor 502. Further, local computing systems, remote data sources and/or services, and other associated logic represent firmware, hardware, and/or software, which may be configured to transmit data outside of the enterprise network via the network agent. The network agent of the enterprise network may be implemented using a general purpose computer and specialized software (such as a server executing service software), a special purpose computing system and specialized software (such as a mobile device or network appliance executing service software), or other computing configurations. In addition, data-selection policies and data transmission preparation policies may be stored in the memory 508 and/or the storage unit 512 and executed by the processor 502.

An example system includes an image sensor mounted on a system and configured to capture an image from the environment surrounding the system, the image from the environment surrounding the system including one or more keypoints, extracting circuitry configured to extract at least one feature value from at least one of the one or more keypoints in the image from the environment surrounding the system, query point evaluation circuitry communicatively coupled to the image sensor and the extracting circuitry and configured to classify an object by sampling a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the system, and a signal bus configured to transmit a signal to the operator of the system if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $\theta$ ($z_k$) is the feature value of the $k^{th}$ keypoint, and is the continuous independent variable of the descriptor function $F(\zeta)$.

An example system of any preceding system includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein:

$$z_m = \frac{1}{N}\sum_{k=0}^{N-1}(z_k - z_c).$$

An example system of any preceding system includes the signal transmitted to the operator of the system is an audible alert.

An example system of any preceding system includes the signal transmitted to the operator of the system is a visual alert.

An example system of any preceding system includes the signal transmitted to the operator of the system includes haptic feedback.

An example system of any preceding system includes the at least one feature value includes a visual appearance feature.

An example system of any preceding system includes the at least one feature value includes a visual word index in a dictionary of visual words, the visual word index having an order relation determined by multi-dimensional scaling.

An example system of any preceding system includes the feature values of the $k^{th}$ keypoint are integer multiples of a single frequency f0.

An example system of any preceding system includes the query point evaluation circuitry is further configured to sample a plurality of randomized descriptor functions, each randomized descriptor function including only a subset of the one or more keypoints.

An example system of any preceding system includes that the system is a vehicle.

An example system of any preceding system includes that the signal to the system is a vehicle control signal.

An example system includes means for capturing an image from the environment surrounding a system with an image sensor, the image from the environment surrounding the system having one or more keypoints. The example system further includes means for extracting at least one feature value from at least one of the one or more keypoints in the image from the environment surrounding the system. The example system further includes means for sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system. The example system further includes means for outputting an alert signal via a signal bus if the sample value satisfies an alert condition.

An example method includes capturing an image from the environment surrounding a system with an image sensor, the image from the environment surrounding the system having one or more keypoints, extracting at least one feature value from at least one of the one or more keypoints in the image from the environment surrounding the system, sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting an alert signal via a signal bus if the sample value satisfies an alert condition.

An example method of any preceding method includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, zc is the query point represented in complex space, $z_k$ is the $k^{th}$ keypoint, $f$ ($z_k$) is the feature value of the $k^{th}$ keypoint, and $f$ is the continuous independent variable of the descriptor function $F(\zeta)$.

An example method of any preceding method includes that the alert signal results in an audible alert.

An example method of any preceding method includes that the alert signal results in a visual alert.

An example method of any preceding method includes that the alert signal results in haptic feedback to the operator of the system.

An example method of any preceding method includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example method of any preceding method includes that the feature values of the $k^{th}$ keypoint are integer multiples of a single frequency f0.

An example method of any preceding method includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein $$z_m = \frac{1}{N}\sum_{k=0}^{N-1}(z_k - z_c).$$

An example method of any preceding method includes that the sampling operation includes sampling a plurality of randomized descriptor functions, each randomized descriptor function including only a subset of the one or more keypoints.

An example system includes an image sensor mounted on a system and configured to capture an image from the environment surrounding the system, the image from the environment surrounding the system including one or more keypoints, one or more processors, and a memory storing processor-executable instructions to perform the operations of: extracting, by the processor, at least one feature value from at least one of the one or more keypoints in the image from the environment surrounding the system; sampling, by the processor, a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting, by the processor, an alert signal via a signal bus if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, zc is the query point represented in complex space, zk is the $k^{th}$ keypoint, $f$ (zk) is the feature value of the $k^{th}$ keypoint, and is the continuous independent variable of the descriptor function F($\zeta$).

An example system of any preceding system includes that the alert signal results in an audible alert.

An example system of any preceding system includes that the alert signal results in a visual alert.

An example system of any preceding system includes that the alert signal results in haptic feedback to the operator of the system.

An example system of any preceding system includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example system of any preceding system includes that the feature values of the $k^{th}$ keypoint are integer multiples of a single frequency f0.

An example system of any preceding system includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein:

$$z_m = \frac{1}{N}\sum_{k=0}^{N-1}(z_k - z_c).$$

An example system of any preceding system includes the sampling operation includes sampling a plurality of randomized descriptor functions, each randomized descriptor function including only a subset of the one or more keypoints.

Figure 6:
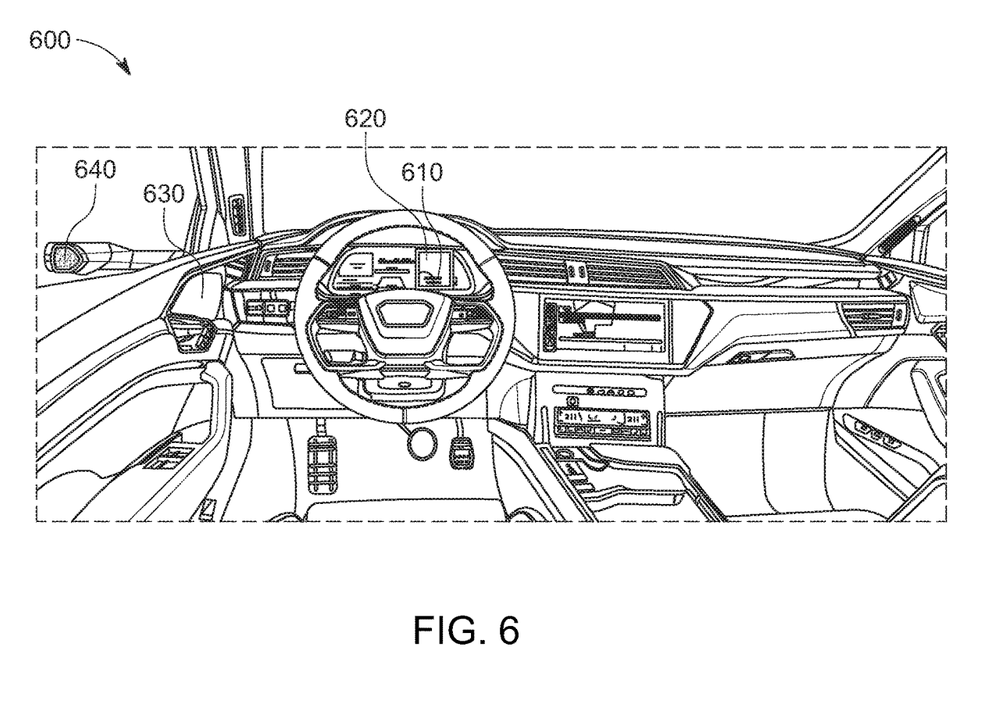
FIG. 6 illustrates an example of a vehicle having a modified image generating system.

FIG. 6 illustrates an example of a vehicle having a modified image generating system.

Referring to FIG. 6, an example of a vehicle such as a motor vehicle 600 is illustrated. The motor vehicle 600 may include a number of displays such as a side image display 630 and an instrument panel display 620, among a number of many other displays which may be used in a vehicle as is known to a person having ordinary skill in the art. For example, such displays may include a standalone display screen, a navigation display, a center console display, a door trim display, a dashboard trim display, among many other display configurations.

The vehicle 600 may also include an image detection and classification system 640 including an image capturing unit and an image processing unit. The screens or displays of the vehicle may also be considered part of the image detection and classification system 640. The image detection and classification system 640 may be similar or the same and perform similar functions or the same functions as the image detection and classification system 100 described in reference with FIG. 1 above. The image detection and classification system 640 may be any system which captures an image or determines conditions of the surrounding environment. In an example, the image detection and classification system 640 includes a camera or a sensor for capturing an image or data regarding the surrounding environment. In this example, the image detection and classification system 640 is mounted at the side of a door of the vehicle 600; however, many other configurations may be used as is known to a person having ordinary skill in the art. For example, the image detection and classification system 640 may be internal, external, or removable with respect to the vehicle 600, among other configurations, and may include an image capturing unit which is structurally separate from but functionally communicative with an image processing unit.

Still referring to FIG. 6, one or more of the displays such as the side image display 630 and the instrument panel display 620 may be a primary display on which a rear or side view image is displayed after being captured using the image detection and classification system 640. For example, and only for purposes of explanation, the side image display 630 may receive an original and unmodified image from the image detection and classification system 640. In this example, the instrument panel display 620 may act as a temporary or auxiliary display while the side image display 630 is acting as the main image display. In response to dirt or debris being detected on the image detection and classification system 640, the temporary or auxiliary display, i.e. the instrument panel display 620, may be initiated. For example, the instrument panel display 620 may pop up on the instrument panel. The image displayed by the instrument panel display 620 may be a manipulated image as described throughout the present disclosure. For example, the manipulated image may include an enhanced image which reduces distortion and improves clarity of the image as compared with the unmodified, original image displayed on the side image display 630.

In this example, the manipulated image displayed on the instrument panel display 620 may include a warning message text overlay 610. The warning message may include a notification to the driver or vehicle user that there is dirt or debris on the image detection and classification system 640. For example, the warning message 610 includes overlaid text which states, "ENHANCED TEMPORARY IMAGE REMOVE DEBRIS—DRIVER'S SIDE CAMERA LENS!" Any number of other messages and text may be used including a variety of languages, texts, fonts, formats, colors, among other aspects. In an example, other sensory warnings may be used in response to a pop up display on the instrument panel 620 being used; for example, a warning noise used in conjunction with the displayed image and text.

It should be appreciated by a person having ordinary skill in the art that while the instrument panel display 620 and side image display 630 are described as the temporary and original displays, respectively, many other configurations and examples may be used. For example, more than two displays may be used any number of combinations of original and modified image displays may be used including interchanging the one or more displays used for the original image with the one or more displays used for the modified image. While in this example, the modified image is described as a temporary image, it should be appreciated that the modified image may also be a permanently displayed image.

Figure 7:
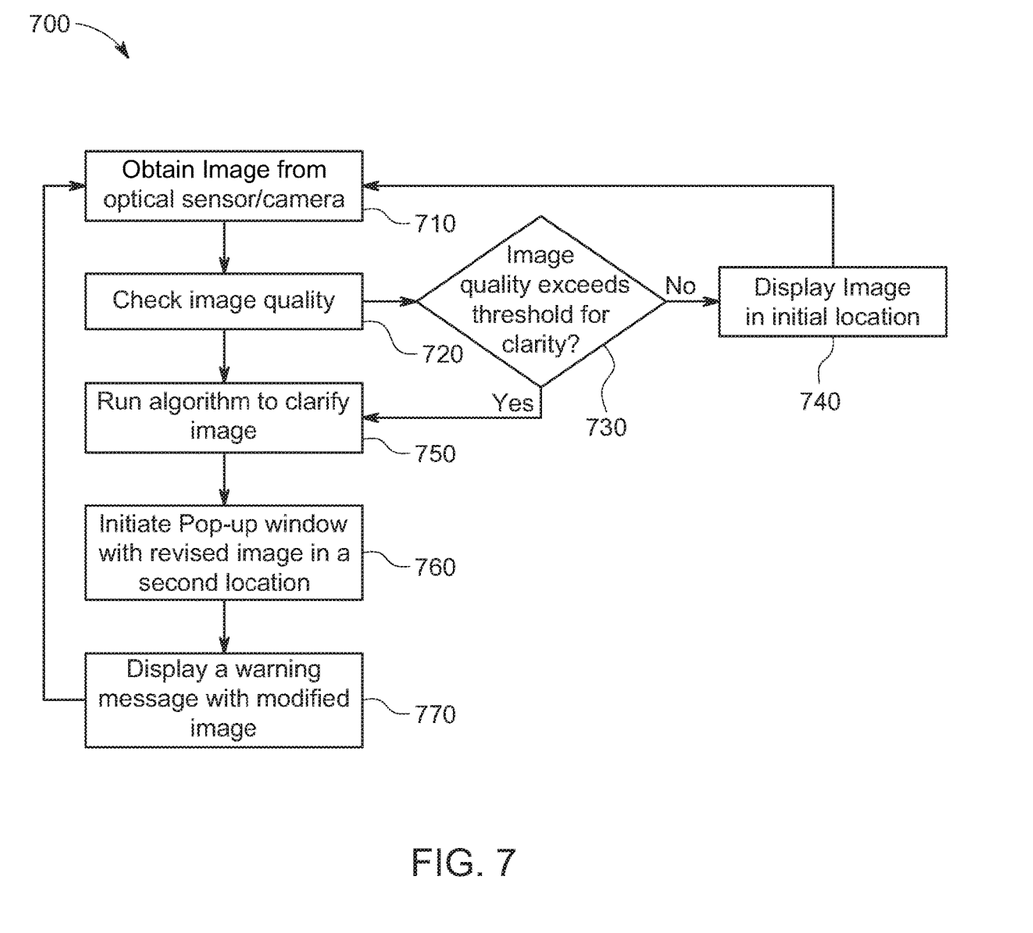
FIG. 7 is a flow chart illustrating an example of a method for generating a modified image in a motor vehicle.

FIG. 7 is a flow chart illustrating an example of a method for generating a modified image in a motor vehicle.

Referring to FIG. 7, an example image display process 700 is described. In step 710, an image may be obtained from an image capturing system, which may include an optical sensor or camera such as the image detection and classification system 640 described in reference with FIG. 6. In step 720, the quality of the captured image may be checked. In step 730, it may be determined whether an image quality exceeds a threshold value for obstruction. In other words, in this step, a predetermined, preset, or user input obstruction threshold may be compared with the obstruction of the captured image. Image obstruction (or lack of image clarity) may be calculated in a number of different ways and according to one or more combined values as is known in the art; for example, using overall image brightness, overall image contrast, and/or pixel clarity, contrast, among other image characteristics. The calculated quality of the captured image is then compared with a threshold value.

In step 740, if the calculated image obstruction value does not exceed the threshold value, i.e. the image does not reach a level of obstructed clarity set by the threshold value, the captured image is displayed ordinarily on a display such as a main display where the image is typically displayed. For example, the main display may be the side image display 630 described in reference with FIG. 6 or any other display as described above. In step 750, if the calculated image obstruction value does exceed the threshold value, i.e. the image reaches a level of obstructed clarity set by the threshold value, an image processing algorithm is run to improve the clarity of the captured image in step 750.

In step 760, a pop-up window may be initiated in a second display location to display the improved quality processed image, as processed in step 750. This display location may be in the instrument panel such as the instrument panel display 620 described in reference with FIG. 6 or any other display as described above. In step 770, a warning message may be displayed or activated with the processed image such as the overlaid warning message 610 described in reference with FIG. 6 or any other warning as described above.

In the image display process 700 of this example, the process 700 may be reinitiated continuously after step 770 and step 740 as part of a continuous loop operation. In addition, one or more steps may be skipped or not used such as displaying a warning in step 770 or any other step.

According to various example aspects and example advantages, rather than a complex cleaning device being provided to calculate a picture for the driver and extend the time until the driver stops to clean the lens, a processed image may be displayed in parallel with the original image on the image detection and classification system screen. In this case, the is still provided the original image according to regulatory requirements and may receive an additional image such as in the instrument panel. This modified addition image may be viewable if the level of dirt is too high and obstacles maybe create problems for original image of the image detection and classification system. In addition, the modified image may be highlighted with a colored frame or may include warning information for cleaning.

The implementations described herein may be implemented as processor-implemented methods, with circuitry such as ASIC designs, or any combination thereof. The system described herein may include a variety of tangible computer-readable storage media and intangible computer-readable communication signals. Tangible computer-readable storage can be embodied by any available media that can be accessed by the object detection and classification system and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions executable by a processor, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the object detection and classification system. In contrast to tangible computer-readable storage media, intangible computer-readable communication signals may embody computer readable instructions executable by a processor, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

Although the present examples may be described and illustrated herein as implemented on a smartphone or a mobile phone, the present examples are suitable for application in a variety of different computing devices including hand-held devices, phones, tablets, desktop computers, and other electronic devices.

What is claimed is:

1. An image detection and classification system for a vehicle, comprising:
    a first display;
    a second display;
    an image capturing unit for capturing an image and displaying the image on at least one of the first display and the second display; and
    an image processing unit configured to process the captured image to improve a clarity of the captured image in response to the captured image having an obstruction value exceeding a threshold obstruction value, wherein the obstruction value represents a level of clarity degradation for the captured image caused by dirt or debris on the image capturing unit,
    wherein the second display is a pop up display on a front instrument panel of the vehicle which only appears in response to the obstruction value exceeding the threshold obstruction value, and the pop up display comprises the captured image after being processed to improve clarity, and
    wherein, in response to the obstruction value exceeding the threshold obstruction value, an imaging processing algorithm is run to improve clarity of the captured image, and a warning notification comprising at least one of a text overlaying or arranged around the processed image, an icon overlaying or arranged around the processed image, and a colored light overlaying or arranged around the processed image is provided by the vehicle in combination with—a warning noise that is provided by the vehicle,
    wherein the first display is a side image display that is mounted on a side of a door of the vehicle and which is configured to display the captured image at all times during operation of the vehicle without processing to improve clarity of the captured image.

2. The image detection and classification system of claim 1, wherein the first display and the second display are each at least one of a side image display, an instrument panel display, a navigation display, a center console display, a door trim display, and a dashboard trim display.

3. The image detection and classification system of claim 1, wherein the second display is an instrument panel display which is configured to display the processed image in response to the obstruction value exceeding the threshold obstruction value.

4. The image detection and classification system of claim 1, wherein the obstruction value of the captured image is determined using at least one of total image brightness, total image contrast, pixel brightness, and pixel contrast.

5. The image detection and classification system of claim 1, wherein the threshold obstruction value is at least one of preset and adjustable by a user.

6. A method for providing an improved clarity image for an image detection and classification system comprising:
    providing an image detection and classification system, comprising:
        first display;
        a second display;
        an image capturing unit; and
        an image processing unit;
    capturing an image of environment surrounding the vehicle using the image capturing unit;
    determining an obstruction value of the captured image depending on obstruction of the captured image, wherein the obstruction value represents a level of clarity degradation for the captured image caused by dirt or debris on the image capturing unit;
    determining that the obstruction value of the captured image exceeds a threshold obstruction value;
    displaying the captured imaging on the first display;
    processing the captured image and displaying the processed captured image on the second display in response to determining that the obstruction value exceeds the threshold obstruction value,
    wherein the second display is a pop up display on a front instrument panel of the vehicle which only appears in response to the obstruction value exceeding the threshold obstruction value, and the pop up display comprises the captured image after being processed to improve clarity;

running an imaging processing algorithm to improve clarity on the captured image in response to the obstruction value exceeding the threshold obstruction value; and providing a warning notification comprising text overlaying the processed image and a warning noise in response to the obstruction value exceeding the threshold obstruction value, wherein the first display is a side image display that is mounted on a side of a door of the vehicle and which is configured to display the captured image at all times during operation of the vehicle without processing to improve clarity of the captured image.

7. The method of claim 6, wherein the first display and the second display are each at least one of a side image display, an instrument panel display, a navigation display, a center console display, a door trim display, and a dashboard trim display.

8. The method of claim 6, further comprising displaying the captured image on the first display at all times during operation of the vehicle without processing to improve clarity of the captured image, wherein the first display is a side image display.

9. The method of claim 6, wherein the second display is an instrument panel display.

10. The method of claim 6, wherein the obstruction value of the captured image is determined using at least one of total image brightness, total image contrast, pixel brightness, and pixel contrast.

11. The method of claim 6, wherein the threshold obstruction value is at least one of preset and adjustable by a user.

12. A vehicle, comprising the image detection and classification system of claim 1.

13. An image detection and classification system for a vehicle, comprising:

a first display;

a second display;

an image capturing unit for capturing an image and displaying the image on at least one of the first display and the second display; and an image processing unit configured to process the captured image to improve a clarity of the captured image in response to the captured image having an obstruction value exceeding a threshold obstruction value, wherein the obstruction value represents a level of clarity degradation for the captured image caused by dirt or debris on the image capturing unit;

wherein the first display is a side image display that is mounted on a side of a door of the vehicle and which is configured to display the captured image at all times during operation of the vehicle without processing to improve clarity of the captured image, and wherein the second display is a pop up display on a front instrument panel of the vehicle which only appears in response to the obstruction value exceeding the threshold obstruction value, the pop up display comprises the captured image after being processed to improve clarity, and wherein, in response to the obstruction value exceeding the threshold obstruction value, an imaging processing algorithm is run to improve clarity of the captured image, and a warning notification comprising at least one of a text overlaying or arranged around the processed image, an icon overlaying or arranged around the processed image, and a colored light overlaying or arranged around the processed image is provided by the vehicle in combination with—a warning noise that is provided by the vehicle.

* * * * *